US 8,644,263 B2

(12) United States Patent
Cheng et al.

(10) Patent No.: US 8,644,263 B2
(45) Date of Patent: Feb. 4, 2014

(54) METHOD AND ARRANGEMENT FOR SINR FEEDBACK IN MIMO BASED WIRELESS COMMUNICATION SYSTEMS

(75) Inventors: Jung-Fu Thomas Cheng, Cary, NC (US); Stephen Grant, Cary, NC (US); Leonid Krasny, Cary, NC (US); Karl Molnar, Cary, NC (US); Yi-Pin Eric Wang, Cary, NC (US)

(73) Assignee: Unwired Planet, LLC, Reno, NV (US)

( * ) Notice: Subject to any disclaimer, the term of this patent is extended or adjusted under 35 U.S.C. 154(b) by 422 days.

(21) Appl. No.: 12/445,070

(22) PCT Filed: Nov. 1, 2006

(86) PCT No.: PCT/SE2006/001241
§ 371 (c)(1),
(2), (4) Date: Apr. 9, 2009

(87) PCT Pub. No.: WO2008/054267
PCT Pub. Date: May 8, 2008

(65) Prior Publication Data
US 2010/0098030 A1    Apr. 22, 2010

(51) Int. Cl.
*H04B 7/216* (2006.01)
(52) U.S. Cl.
USPC ............................................ 370/335; 455/69
(58) Field of Classification Search
USPC .................. 370/335, 210, 342, 208; 375/260; 455/562.1, 561, 68, 101, 67.3, 522, 455/67.13
See application file for complete search history.

(56) References Cited

U.S. PATENT DOCUMENTS

| 2003/0218973 | A1* | 11/2003 | Oprea et al. | 370/210 |
| 2004/0120290 | A1* | 6/2004 | Makhijani et al. | 370/335 |
| 2004/0198404 | A1* | 10/2004 | Attar et al. | 455/522 |
| 2004/0233918 | A1 | 11/2004 | Larsson et al. | |
| 2005/0111566 | A1* | 5/2005 | Park et al. | 375/267 |
| 2005/0181739 | A1* | 8/2005 | Krasny et al. | 455/69 |
| 2005/0195886 | A1* | 9/2005 | Lampinen et al. | 375/144 |

(Continued)

FOREIGN PATENT DOCUMENTS

| JP | 2005277570 A | 10/2005 |
| WO | 2005081444 A1 | 9/2005 |
| WO | 2005109717 A1 | 11/2005 |
| WO | WO 2006/062356 A1 | 6/2006 |

OTHER PUBLICATIONS

English translation of Office Action issued on Feb. 1, 2011 in corresponding Chinese Patent Application No. 200680056242.6.

(Continued)

*Primary Examiner* — Bunjob Jaroenchonwanit
(74) *Attorney, Agent, or Firm* — Nixon & Vanderhye P.C.

(57) ABSTRACT

The present invention relates to a method and arrangement to enhance the communication performance in wireless communication systems. The method of the invention provides better adjustment of reported SINR in MIMO, and PARC-MIMO based communication systems. According to the method information relating to signal-to-interference-plus-noise ratio is determined by the user equipment and reported to the base station. The base station adjust reported SINRs using a model of the SINR dependences of power and code allocation. The dependences is modeled by a function comprising a first parameter relating only to power allocation and a second parameter relating only to code allocation. The first parameter has a power allocation exponent and the second parameter has a code allocation exponent. Both the power allocation exponent and the code allocation exponent are data stream dependent.

11 Claims, 7 Drawing Sheets

(56) References Cited

U.S. PATENT DOCUMENTS

| | | | |
|---|---|---|---|
| 2005/0250544 A1* | 11/2005 | Grant et al. | 455/562.1 |
| 2006/0002360 A1* | 1/2006 | Ji et al. | 370/343 |
| 2006/0023624 A1* | 2/2006 | Han et al. | 370/204 |
| 2006/0079221 A1* | 4/2006 | Grant et al. | 455/423 |
| 2006/0234777 A1* | 10/2006 | Vannithamby et al. | 455/562.1 |
| 2006/0251180 A1* | 11/2006 | Baum et al. | 375/260 |
| 2007/0066239 A1* | 3/2007 | Hart | 455/69 |
| 2007/0066240 A1* | 3/2007 | Hart | 455/69 |
| 2007/0104087 A1* | 5/2007 | Tee et al. | 370/208 |
| 2007/0218950 A1* | 9/2007 | Codreanu et al. | 455/562.1 |
| 2007/0280147 A1* | 12/2007 | Catreux-Erceg et al. | 370/318 |
| 2008/0080634 A1* | 4/2008 | Kotecha et al. | 375/267 |
| 2010/0111027 A1* | 5/2010 | Hart | 370/329 |

OTHER PUBLICATIONS

Partial translation of Japanese Office Action received in corresponding Japanese Application No. JP2009-534529 issued on Feb. 21, 2012.

3GPP TSG RAN 25.211 "Physical Channels and Mapping of Transport Channels onto Physical Channels (FDD)", Release 5.

3GPP TSG RAN 25.214 V5.5.0 "Physical layer Procedures (FDD)", Release 5.

Park, C.S. et al., "Transmit Power Allocation for Successive Interference Cancellation in Multicode MIMO Systems", 2005 IEEE International Conference on Seoul, Korea, May 16-20, 2005.

Chung S. T. et al., "Approaching Eigenmode BLAST Channel Capacity Using V-BLAST with Rate and Power Feedback", IEEE VTC'01-Fall, Atlantic City, NJ, Oct. 2001.

3GPP TSG RAN 25.211 "Physical Channels and Mapping of Transport Channels onto Physical Channels (FDD)", Release 5, 2003.

3GPP TSG RAN 25.214 V5.5.0 "Physical layer Procedures (FDD)", Release 5, 2003.

Extended Search Report dated Jun. 27, 2012 in Application No. EP 06812965.9.

* cited by examiner

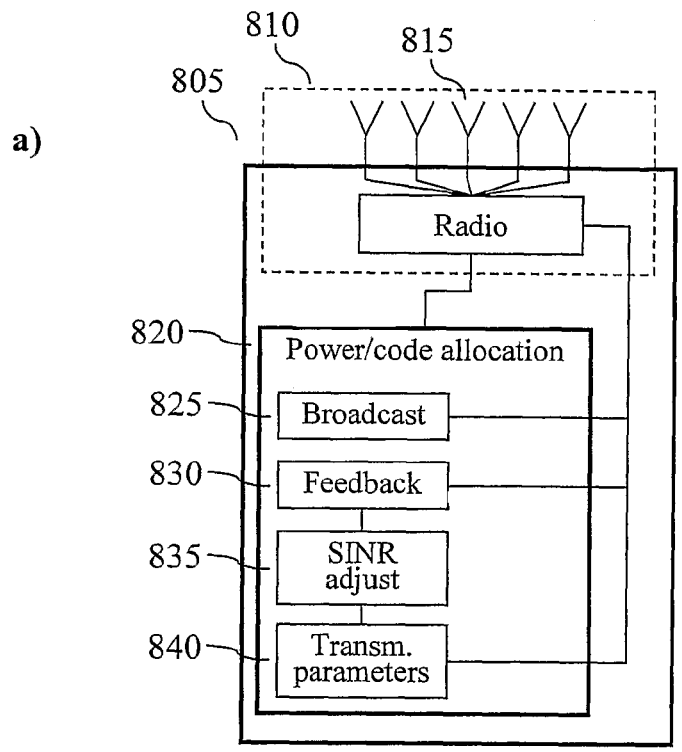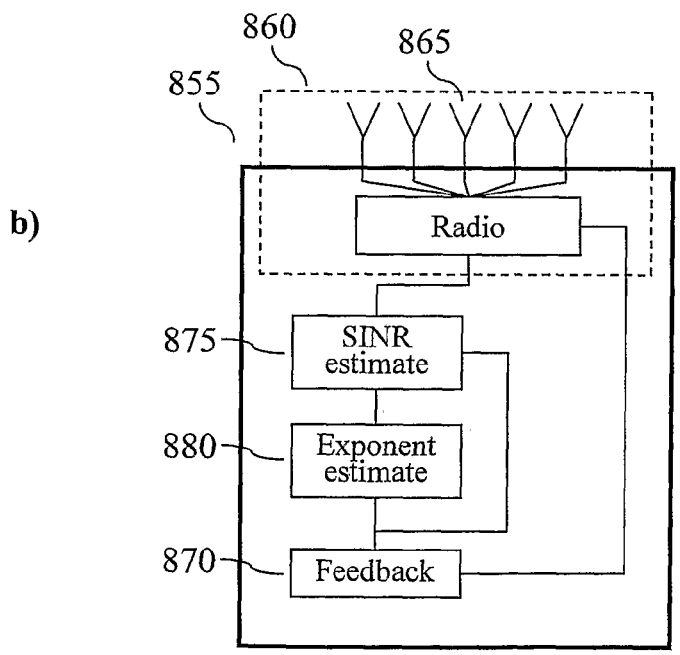
Fig. 8a-b

METHOD AND ARRANGEMENT FOR SINR FEEDBACK IN MIMO BASED WIRELESS COMMUNICATION SYSTEMS

RELATED APPLICATIONS

This application claims priority and benefit from International Application No. PCT/SE2006/001241, filed Nov. 1, 2006, the entire teachings of which are incorporated herein by reference.

FIELD OF INVENTION

The present invention relates to a method and arrangement for channel quality feedback. In particular, the present invention relates to SINR feedback in MIMO based communication systems.

BACKGROUND OF THE INVENTION

The demand for traffic capacity, coverage and reliability in the wireless communication systems is seemingly ever-increasing. One bottleneck in the traffic capacity is the limited frequency spectrum available for communication purposes, the limitation being both physical—only part of the frequency spectrum is suitable for communication and the information content per frequency and time is limited, and organizational—the useful part of the spectrum is to be used for a number of purposes including: TV and radio broadcast, non-public communication such as aircraft communication and military communication, and the established systems for public wireless communication such as GSM, third-generation networks (3G), Wireless Local Area Networks (WLAN) etc. Recent development in the area of radio transmission techniques for wireless communication systems show promising results in that the traffic capacity can be dramatically increased as well as offering an increased flexibility with regards to simultaneously handling different and fluctuating capacity needs. Promising techniques are based on the concept of Multiple-Input-Multiple-Output (MIMO) see for example A. Goldsmith et al. "Capacity Limits of MIMO Channels", IEEE Journal on Selected Areas of Comm., VOL. 21, NO. 5, JUNE 2003. Compared to presently used transmission techniques such as TDMA (as used in GSM) and WCDMA (as used in UMTS), the above exemplified technique represents a much better usage of the available radio frequency spectrum. As an example of the capabilities of, but also the requirement set forth by, the new transmission techniques, the MIMO wireless systems will be briefly described with references to FIG. 1 (prior art). A comprehensive description of the basic principles as well as recent development and areas of research of MIMO is to be found in the above referred article by A. Goldsmith et al.

A radio link in a MIMO system is characterized by that the transmitting end as well as the receiving end may be equipped with multiple antenna elements. The idea behind MIMO is that the signals on the transmit (TX) antennas at one end and the receive (RX) antennas at the other end are "combined" in such a way that the quality (bit-error rate, BER) or the data rate (bits/sec) of the communication for each MIMO user will be improved. Such an advantage can be used to increase both the network's quality of service and the operator's revenues significantly. A core idea in MIMO systems is space-time signal processing in which time (the natural dimension of digital communication data) is complemented with the spatial dimension inherent in the use of multiple spatially distributed antennas. A key feature of MIMO systems is the ability to turn multipath propagation, traditionally regarded as a limiting factor in wireless transmission, into a benefit for the user. MIMO effectively takes advantage of random fading and when available, multipath delay spread, for increasing transfer rates. The prospect of significant improvements in wireless communication performance at no cost of extra spectrum (only hardware and complexity are added) has naturally attracted widespread attention. MIMO is, due to the promising possibilities, considered for enhancing data rates in third generation cellular systems, specifically for the High-Speed Downlink Shared Channel (HS-DSCH).

A compressed digital source in the form of a binary data stream 105 is fed to a transmitting block 110 encompassing the functions of error control coding and (possibly joined with) mapping to complex modulation symbols (quaternary phase-shift keying (QPSK), M-QAM, etc.). The latter produces several separate symbol streams which range from independent to partially redundant to fully redundant. Each is then mapped onto one of the multiple TX antennas 115. Mapping may include linear spatial weighting of the antenna elements or linear antenna space-time precoding. After upward frequency conversion, filtering and amplification, the signals are launched into the wireless channel. N TX antennas 115 are used, and the transmitting block 110 may typically comprise means for N simultaneous transmissions. The symbol streams transmitted on the N TX antennas are commonly referred to as antenna streams. At the receiver, the signals are preferably captured by multiple antennas (M) 120 and demodulation and demapping operations are performed in the receiving block 125 to recover the message. The level of intelligence, complexity, and a priori channel knowledge used in selecting the coding and antenna mapping algorithms will vary substantially depending on the application. This determines the class and performance of the multiantenna solution that is implemented. The MIMO communication may for example occur between a base station (BS) and an user equipment (UE), each provided with the required multiantennas.

The multiplexing alone is, as previously mentioned, not enough for achieving the dramatic increase in gain. Advanced coding/decoding and mapping schemes, i.e. the space-time coding, is essential. A knowledge of the radio channel is needed for the decoding already in today's existing wireless systems such as GSM and UMTS, and in the multiantenna systems this knowledge is absolutely critical. In some of the most promising implementation proposals for MIMO, the knowledge of the channel, is used not only in the demodulation performed in the receiver side, but also in the encoding and modulation on the transmitting side when the system employs adaptive rate control. With adaptive rate control, the transmitter determines a transmission rate appropriate for a given radio channel condition. When the channel condition is good, a high transmission rate is used, whereas when the channel condition is bad, a low transmission rate is used. The transmission rate deter wines the modulation order (e.g., QPSK versus 16QAM) and the coding rate of forward error-correction code (FEC) on the transmitting side. Accurate rate control is highly desirable in that it improves system and user throughput. In WCDMA release 5, transmission rate control is facilitated by a channel quality indicator (CQI) feedback provided by a mobile station. The CQI indicates the receiver signal-to-interference-plus-noise-ratio (SINR) under the current radio condition. In essence, a CQI indicates the highest transmission data rate in order to achieve a certain block error rate (e.g., 10%) under current radio condition. Auxiliary control signaling may be needed to facilitate accurate CQI estimation and rate control in a MIMO system. For example, instantaneous power and code allocation may be signaled from the base station to mobile terminals to facilitate CQI estimation. Since this type of information is signaled to all the mobile terminals in the system, this could be considered as a broadcast control information. Other broadcast control information may also be needed to facilitate accurate CQI estimation. The use of CQI according to WCDMA release 5 is described in 3rd Generation Partnership Project (3GPP), Technical Specification Group Radio Access Networks: Physical channels and mapping of transport channels onto physical channels (FDD), 3GPP TR 25.211, version 5.5.0, September 2003, and in 3rd Generation Partnership Project (3GPP), Technical Specification Group Radio Access Networks: Physical Layer Procedures (FDD) 3GPP TR 25.214, version 5.9.0, June 2003.

In UMTS a common pilot channel (CPICH) is used for the characterization of the dedicated radio channel. First, the receiver relies on the CPICH to obtain an estimate of the channel impulse response that is needed during demodulation. With adaptive rate control, the receiver may also use the CPICH to estimate the highest transmission rate that the current channel condition may support in order to satisfy a targeted block error rate requirement. This transmission rate is then communicated back to the transmitter in a form of channel quality indicator (CQI) per WCDMA release 5. The CPICH is a code channel carrying known modulated symbols scrambled with a cell-specific primary scrambling code. UMTS also provides for secondary CPICHs, which may have individual scrambling codes, which typically are used in operations of narrow antenna beams intended for service provision at places with high traffic density. A similar approach is suggested for MIMO based systems. In MIMO a plurality of common pilot channels (CPICHs), corresponding to the number of transmitting antennas or antenna streams, are used to characterize each of the channels between a transmit antenna and a receive antenna. The requirement for accurate channel characterization in combination with the plurality of CPICHs can make the control signaling relatively extensive, and will take up valuable transmission resources.

Recently, a promising new MIMO technique called PARC (Per-Antenna-Rate-Control) has been proposed for use with HS-DSCH, see S. T. Chung et. Al, "*Approaching eigenmode BLAST channel capacity using V-BLAST with rate and power feedback*", Proc. IEEE VTC'01-Fall, Atlantic City, N.J., October 2001. The scheme is based on a combined transmit/receive architecture that performs independent coding of the antenna streams at different rates, followed by the application of successive interference cancellation (SIC) and decoding at the receiver. It requires feedback of the per-antenna rates which are based on the signal-to-interference-plus-noise ratios (SINRs) at each stage of the SIC. With this scheme, it has been shown that the full open-loop capacity of the MIMO flat-fading channel may be achieved, thus offering a potential for very high data rates. SINR feedbacks are already utilized in the link adaptation process employed for HS-DSCH to enhance the spectral efficiency. With link adaptation, the base station selects an appropriate data transmission rate suitable for a given channel condition. Thus, when the channel is in a deep fade, a lower data transmission rate is used, whereas when the channel condition is good, a higher data transmission rate is used. Rate adaptation can also be used to account for the variation of code and power availability. When the base station has lots of available codes and available power, a higher data transmission rate is used. On the other hand, when the base station has only very limited amount of unused codes and power, a lower data transmission rate is used. In a scenario wherein link adaptation is used, all stand-by UEs have to report back to the base station a Channel Quality Indicator (CQI). The CQI is typically a quantized version of the UE receiver SINR, measured, for example, at the output of the receiver. The SINR can be the symbol SINR on a single code of the HS-DSCH, or can be the aggregate SINR summed over all the codes of HS-DSCH.

In the rate adaptation process, an UE, without the knowledge of instantaneous code and power available at the serving base station, typically estimates the output symbol SINR according to a nominal code and power allocation. In SISO operations, nominal code allocations are defined in CQI tables, standardized by the 3GPP, used for rate adaptation, where the nominal power allocation is signaled in one of the downlink control channels. These nominal code and power allocations are established for the purpose of CQI measurement and reporting, and are not intended for reflecting the actual code and power availability at the base station. In fact, the control channel that carries the nominal power allocation has a very slow update rate. The base station receives the SINR feedback and adjusts the reported SINR according to instantaneous power and code allocations that will be allocated to the UE. The adjustment is a linear scaling operation. The adjusted SINR is used by the base station to select an appropriate modulation and coding scheme (MCS).

The scaling process in a MIMO system would be significantly more complex than in the above outlined SISO system. The complexity arises from the plurality of active transmission antennas and the estimated SINR will exhibit convoluted dependence on the power and code allocations. Even a mall error in the adjustment of the SINR will lead to significant degradation of the system throughput. Thus, a correct adjustment of the SINR is of high importance. At the same time it is of interest not to increase the amount of control signaling.

SUMMARY OF THE INVENTION

To fully take advantage of the potentially high data rates offered by novel transmission techniques such as MIMO, and PARC-MIMO, the requirement for a correct estimation of SINR values is high. Prior art methods may lead to errors in the adjustment of SINR in the sending station, and even a small error can lead to significant degradation of the system throughput The object of the present invention is to provide a method, and radio nodes, that overcomes the drawbacks of the prior art techniques. This is achieved by the method, the base station and the user equipment as defined in the independent claims.

The method according to the invention is applicable in a MIMO scenario wherein a base station is in communication with at least one user equipment utilizing a plurality, m, of antenna streams. Provided is an adjustment method for adjusting reported SINRs in order to select appropriate transmission parameters, such as modulation and coding rate. The adjustment is based at least partly on reported channel quality indicators (CQI). According to the method the CQI comprises information relating to signal-to-interference-plus-noise ratio determined by the user equipment for a nominal power and code allocation. The base station adjusts reported SINRs using a model of the SINR dependences of power and code allocation wherein the dependences is modeled by a function comprising a first parameter relating only to power allocation and a second parameter relating only to code allocation. The first parameter has a power allocation exponent and the second parameter has a code allocation exponent.

The modeling function used in the method according to the invention has the essential form of:

$$SINR_{inst}(m) = \alpha^{q_\alpha(m)} b^{q_K(m)} SINR_{ref}(m),$$

wherein $SINR_{inst}(m)$ is an adjusted SINR value to be used in the adjustment of transmission parameters for the mth data stream, $SINR_{ref}(m)$ is an estimated value for the mth data stream based on previously broadcasted information on reference power and/or code allocation, a is the first parameter relating only to power allocation, and b is the second parameter relating only to code allocation. $Q_\alpha(m)$ is the power allocation exponent associated with the first parameter, and $q_K(m)$ the code allocation exponent associated with the second parameter. The notations of $q_\alpha(m)$ and $q_K(m)$ imply that these exponents can be data stream dependent. This data stream dependency in $q_\alpha(m)$ and $q_K(m)$ arises due to channelization code reuse in the transmission and/or the use of successive interference cancellation in the MIMO receiver.

The method according to the invention is advantageously implemented in MIMO systems with or without utilizing successive interference cancellation, SIC. In either case, for each data stream an output SINR(m) can be related, and a power allocation exponent, $q_\alpha(m)$, and a code allocation exponent $q_K(m)$ can be estimated utilizing the outputted SINR(m) for each m.

The method comprises the basic steps of:

First representations of power and/or code allocation are broadcasted from the BS.

The UE receives broadcasted first representations of power and/or code allocation.

The UE estimates SINR using the received first representations of power and/or code allocation.

The UE provides the BS with CQI in a feedback procedure, the CQI comprising information relating to the estimated SINR.

The BS adjusts the reported SINR estimates according to the instantaneous power and code allocation using the assumption that the output SINR of the UE receiver can be modeled as the function described above.

The BS selects transmission parameters, for example modulation and coding scheme (MCS), based on the adjusted SINR.

One advantage of the present invention is that more accurate SINR adjustments can be made leading to a better choice of modulation and coding scheme. This in turn leads to a higher throughput in the system and/or higher quality in the communication.

One further advantage of the present invention is that the model of the SINR(m) only requires two parameters, the power allocation exponent and the code allocation exponent, to facilitate an accurate selection of modulation and coding scheme. Hence, utilizing the method of the present invention PARC-MIMO can be introduced without any significant increase in the amount of control signaling.

Yet another advantage is that the method according to the invention allows flexible implementations in a system, exemplified in the below described embodiments. The flexibility is manifested in for example, the UE can feedback SINRs or allocation exponents, the use of a combination of allocation exponents reported in the feedback and pre-determined, typically approximate, values stored in the BS, and in the use of a plurality of broadcasted reference values of power and code allocation.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

The invention will now be described in detail with reference to the drawing figures, wherein

FIGS. 8a and b schematically illustrates a radio base station (a) and user equipment (b) according to the present invention.

DETAILED DESCRIPTION OF THE INVENTION

Figure 1A:
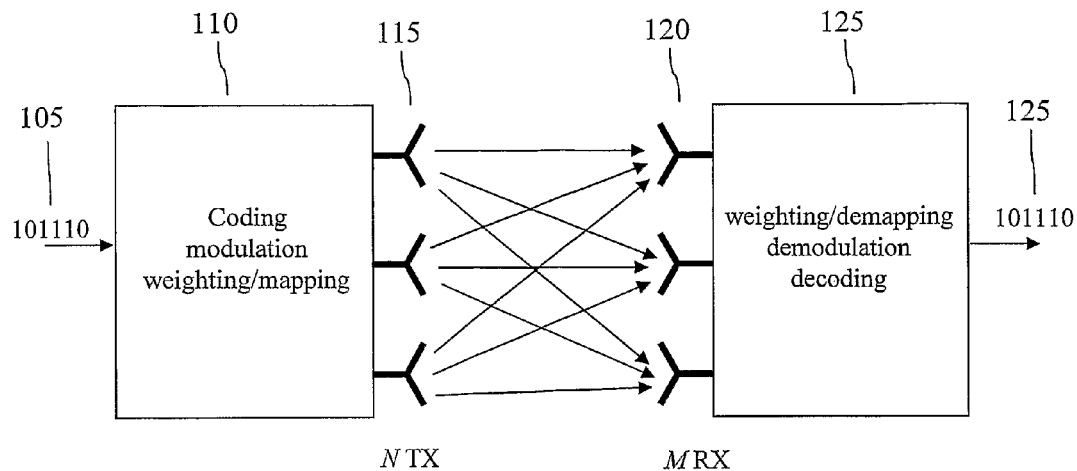
FIG. 1 is a schematic illustration of a MIMO system (prior art)

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 2:
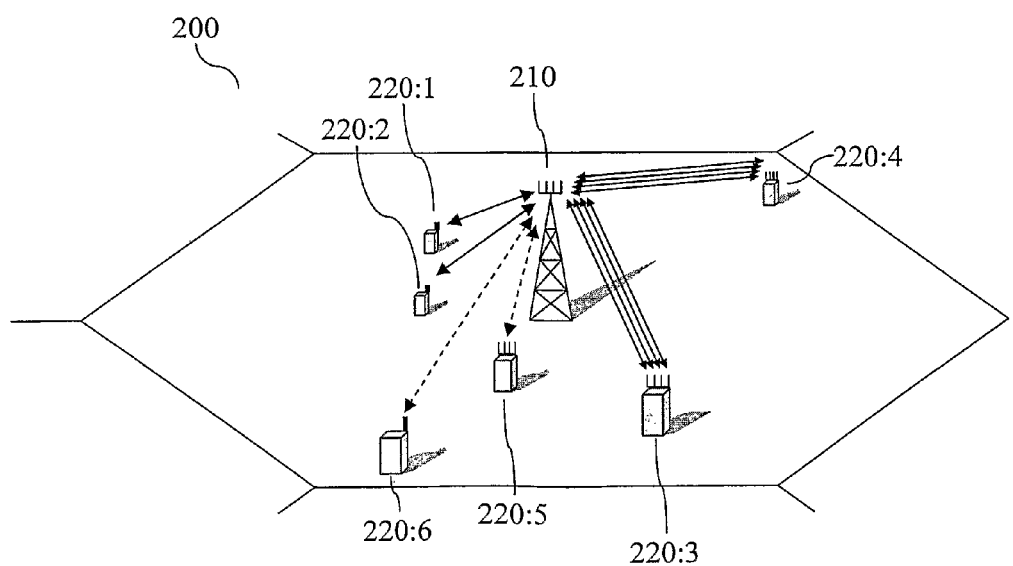
FIG. 2 is a schematic illustration of a wireless communication system wherein the methods and arrangement according to the present invention may be implemented.

A possible communication scenario wherein the method and arrangement according to the present invention is schematically illustrated in FIG. 2. The wireless communication network 200 comprises of a radio base station, BS, 210, sometimes also in the art referred to as node B and a plurality of User Equipment, UE, 220:1-5. Some of the UE, 220:1-4 are in active communication with the BS 210, which in the figure is indicated with solid arrows, while the other UEs 220:5-6 are in a standby mode, however still maintaining some control signaling with the BS 210 (dashed arrows). The BS 210 and at least some of the UEs, UEs 220: 3-5 are equipped with means to communicated over a plurality of links, for example multi-antenna arrangements adapted for MIMO-based communication. The channel characterization relies on pilot signaling on the common pilot channels, the CPICH channels. Each transmit antenna, or antenna stream is associated with one CPICH.

The term "radio base station" should be given a broad interpretation, including the meaning of a BS as it is conceived in current wireless systems such as GSM and UMTS, but also a radio node that does not have to be fixed, and/or only occasionally has the role of a BS, in for example an Ad-hoc network.

The UEs may for example be a mobile phone, a user equipment of various kinds: such as laptop computers, PDAs, cameras, video/audio players and game pads provided with radio communication abilities, a vehicle or a stationary machine provided with radio communication abilities.

In the communication system according to the invention MIMO-PARC (Per-Antenna-Rate-Control) is utilised to provide the High-Speed Downlink Shared Channel (HS-DSCH). As indicated in the background section it is in PARC-MIMO of high importance for maintaining a high throughput, that the BS 210 can broadcast updates of power and/or code allocation information to the UEs 220. The information facilitates accurate SINR estimates in the UEs. PARC-MIMO requires feedback of the per-antenna rates which are based on the signal-to-interference-plus-noise ratios (SINRs) at each stage of the SIC of the UEs receivers.

In a MIMO based system, scaling process performed in the base station is typically non-trivial. In general, the output symbol SINR in dB can be modeled approximately as a linear function of code and power allocation. However, the linear scaling slope depends on $I_{or}/I_{oc}$, multipath delay profile, as well as the code and power allocation. $I_{or}$ is the total power received from the serving base station, and $I_{oc}$ is the total power received from all the other base stations plus thermal noise. SINR scaling at the base station, if not done correctly, will result in the adjusted SINR to be very different from the true SINR. If the adjusted SINR is too high, the selected transmission data rate is higher than the rate that the radio channel can support. This often results in errors in the transmitted data. If the adjusted SINR is too low, the selected transmission data rate is lower than the rate that the radio channel can support. In either case, the system throughput is degraded.

The G-RAKE output symbol SINR can be described as:

$$SINR = \frac{\alpha}{K} h^H R^{-1} h \quad (1)$$

where $\alpha$ and K are the total power and number of spreading codes allocated to the HS-DSCH, respectively, and h and R are, respectively, the net response and noise covariance. The ratio $\alpha/K$ can be interpreted as the power allocated to each of the HS-DSCH codes. In SISO Systems, the noise covariance matrix R can be measured directly from the CPICH. It can be shown that in the SISO case, R is independent of power allocation on the downlink code Channels. As a result, SINR in dB scales linearly, with slope 1 or −1 with respect to power allocation ($\alpha$) and code allocation (K), respectively.

For rate adaptation in a SISO System, the UE estimates an SINR based on reference power and code allocations $\alpha_{ref}$ and $K_{ref}$, respectively. The factors $\alpha_{ref}$ and $K_{ref}$ are established as a common reference for the purpose of SINR estimation, and are typically not the same as the actual instantaneous power and code allocations, denoted by $\alpha_{inst}$ and $K_{inst}$, respectively. In this setup, the SINR estimated in the UE is therefore $$SINR_{ref} = \frac{\alpha_{ref}}{K_{ref}} h^H R^{-1} h \quad (2)$$

The estimated SINR will then be reported back to the Node B through CQI feedbacks, and the Node B will need to scale $SINR_{ref}$ for the instantaneous power and code allocations. Note that the instantaneous SINR is $$SINR_{inst} = \frac{\alpha_{inst}}{K_{inst}} h^H R^{-1} h = \frac{\alpha_{inst}}{\alpha_{ref}} \left(\frac{K_{inst}}{K_{ref}}\right)^{-1} SINR_{ref} \quad (3)$$

Converting eq. (3) to dB yields:

$$(SINR_{inst})_{dB} = \left(\frac{\alpha_{inst}}{\alpha_{ref}}\right)_{dB} - \left(\frac{K_{inst}}{K_{ref}}\right)_{dB} + (SINR_{ref})_{dB} \quad (4)$$

Thus, the instantaneous SINR in dB scales linearly with both power and code adjustments, and with scaling slopes 1 and −1, respectively.

In the MIMO-PARC case. the SIC-GRAKE Output SINR for the m:th stream can be shown as $$SINR(m) = \frac{\alpha(m)}{K} h^H(m) R^{-1}(m) h(m) \quad (5)$$

where $\alpha(m)$ is the power allocated to MIMO Channels on antenna (or data stream) m, K is the number of MIMO channelization codes, and h(m) and R(m) are respectively, the net response and noise covariance for the m:th stream. The noise covariance for the m:th decoded stream can be expressed as [3]

$$R(m) = R_{cpich} + R_{CR}(m) - R_{SIC}(m) \quad (6)$$

where $R_{cpich}$ is the noise covariance measured from the CPICH, $R_{cr}$ is contributed by code-reuse interference, and $R_{sic}(m)$ accounts for the interference removed during the SIC process prior to the m:th decoding stage. The code-reuse term $R_{cr}$ is given as [3].

$$R_{CR}(m) = \frac{\alpha}{K} \sum_{n=m+1}^{M} h(n) h^H(n) \quad (7)$$

Wherein it is assumed that the MIMO power is evenly distributed across active transmit antennas, $\alpha(1) = \alpha(2) = \ldots = \alpha(M) = \alpha$, where M is the number of antenna steams and $M\alpha$ is the total base station power allocated to the MIMO user of interest, and $\alpha/K$ is the power per MIMO code, per active transmit antenna. It should be noted that $R_{cr}(m)$ depends on power and code allocations. Furthermore, the term $R_{sic}(m)$ also depends on MIMO power allocation a because SIC is applied to own MIMO signals only. These two factors impact the SINR scaling issue significantly because in this case SINR(m) depends on K and $\alpha$ in a more convoluted manner, $$SINR(m) = \frac{\alpha}{K} h^H(m) R^{-1}(m, \alpha, K) h(m) \quad (8)$$

Note that when SIC is not applied, the last term on the right-hand side of (6) can be dropped and the code-reuse term becomes $$R_{CR}(m) = \frac{\alpha}{K} \sum_{\substack{n=1 \\ n \neq m}}^{M} h(n) h^H(n).$$

In this case, SINR(m) still depends on K and $\alpha$ in a more convoluted manner due to the dependency of $R_{cr}$ on m. According to the invention SINR(m) is effectively modeled as a function with an dependence of a power allocation exponent, or power scaling slope, and a code allocation exponent or code scaling slope, hence it can be shown that $(SINR(m))_{dB}$ is still a linear function of power and code allocations, $$SINR_{inst}(m) = \left(\frac{\alpha_{inst}}{\alpha_{ref}}\right)^{q_\alpha(m)} \left(\frac{K_{inst}}{K_{ref}}\right)^{q_K(m)} SINR_{ref}(m) \qquad (9)$$

$$((SINR_{inst}(m))_{dB} = (SINR_{ref}(m))_{dB} + q_\alpha(m)\left(\frac{\alpha_{inst}}{\alpha_{ref}}\right)_{dB} + q_K(m)\left(\frac{K_{inst}}{K_{ref}}\right)_{dB}$$

However, the exponents/slopes $q_\alpha(m)$ and $q_K(m)$ are not always one or −1. Rather, in realistic scenarios the power scaling slope $q_\alpha(m)$ is a function of m, $I_{or}/I_{oc}$, multipath profile and code allocation $K_{inst}$. The range of the power scaling exponents/slopes is $0<q_\alpha(m)\leq 1$. Also, $0<q_\alpha(1)<q_\alpha(2)<\ldots<q_\alpha(M)=1$. The code scaling slope $q_K(m)$ is a function of m, $I_{or}/I_{oc}$, multipath profile and power allocation $\alpha_{inst}$. The range of the code scaling exponents/slopes is $-1\leq q_K(m)<0$. Also, $-1=q_K(M)<q_K(M-1)<\ldots<q_K(1)<0$. Using a nominal scaling slope 1 and −1 for both $q_\alpha(m)$ and $q_K(m)$, respectively, may result in large rate adaptation errors. This data stream dependency arises due to channelization code reuse in the transmission and/or the use of successive interference cancellation in the MIMO receiver.

Figure 3:
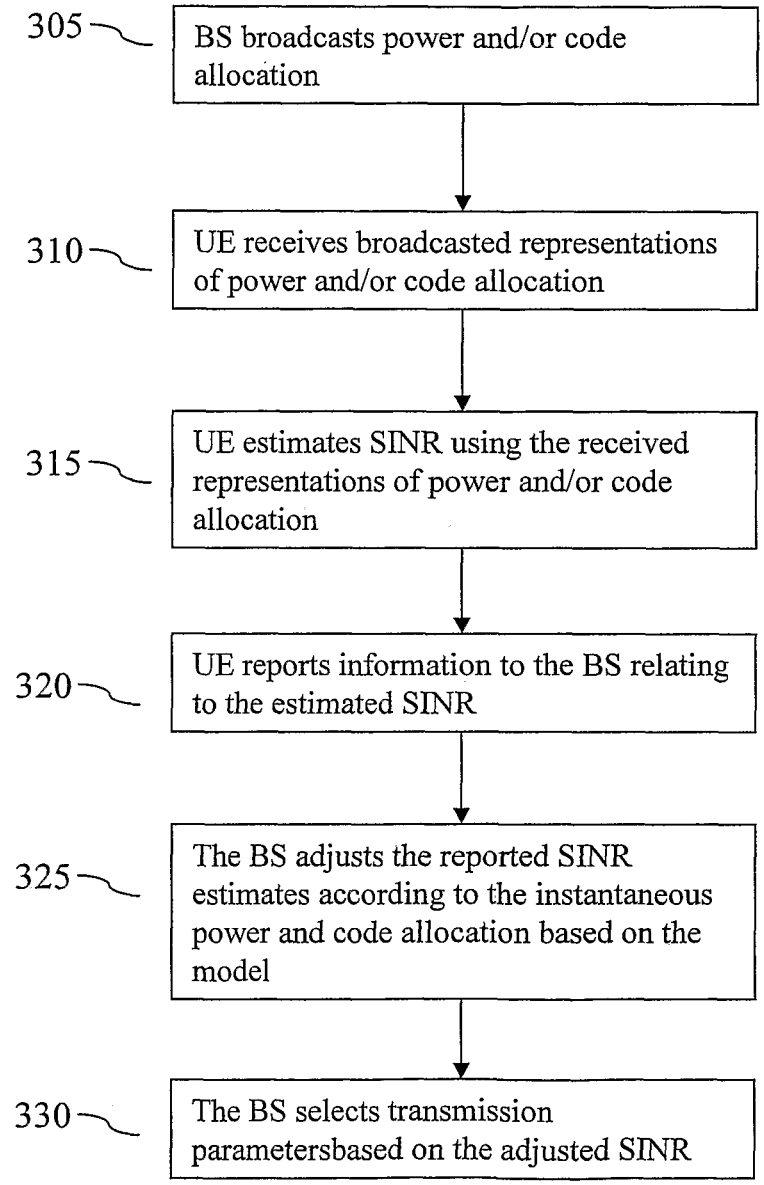
FIG. 3 is a flowchart illustrating the method according to the present invention.

The method of the present invention utilizes that the output SINR for the m:th stream, SINR(m), is modeled as a function with a dependence on the power allocation exponent and the code allocation exponent and that this assumption is used by the serving base station in the adjustment of reported SINR to facilitate the selection of modulation and coding scheme (MCS). The model, corresponding to equation (9), has the essential form:

$$SINR_{inst}(m) = \alpha^{q_\alpha(m)} b^{q_K(m)} SINR_{ref}(m) \qquad (10)$$

wherein $SINR_{inst}(m)$ is the adjusted SINR to be used in the adjustment of transmission parameters, $SINR_{ref}(m)$ is the estimated value based on previously broadcasted information on reference power and/or code allocation, $\alpha$ is a first parameter relating only to power allocation, b is a second parameter relating only to code allocation, $q_\alpha(m)$ the power allocation exponent, and $q_K(m)$ the code allocation exponent. The term "essential form" should be interpreted as (10) describing the characteristic relation between the adjusted SINR and the estimated SINR. As appreciated by the skilled in the art, for example constants could be added, scaling constants included and parameter reflecting other factors than power and code allocation included in order to adapt the model to a specific implementation. The method is illustrated by the flowchart of FIG. 3 and comprises the steps of:

305: First representations of power and/or code allocation are broadcasted from the BS.
310: The UE receives broadcasted first representations of power and/or code allocation.
315: The UE estimates SINR(s) using the received first representations of power and/or code allocation.
320: The UE provides the BS with CQI in a feedback procedure, the CQI comprising information relating to the estimated SINRs.
325: The BS adjusts the reported SINR estimates according to the instantaneous power and code allocation using the assumption that the output SINR of the UE receiver can be modeled as a function with an dependence on the power allocation exponent, and the code allocation exponent.
330: The BS selects transmission parameters, for example modulation and coding scheme (MCS), based on the adjusted SINR. The transmission parameters may further include the number of MIMO streams.

It should be noted that the above steps do not necessarily have to be taken in the above order.

The SINR estimation and adjustment is performed separately for each antenna stream.

Figure 4:
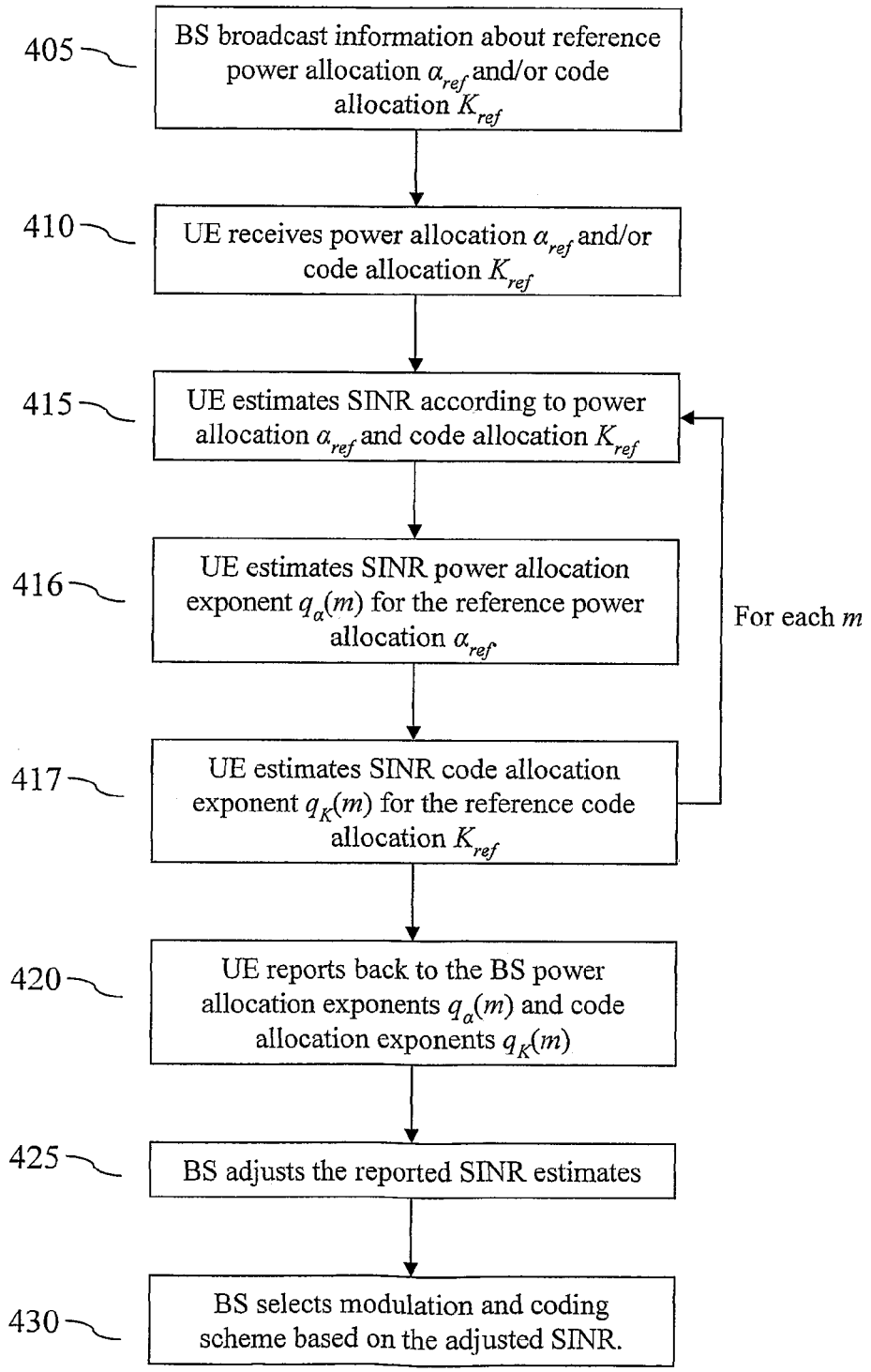
FIG. 4 is a flowchart illustrating one embodiment of the method according to the invention.

According to a first embodiment of the invention the power allocation exponent $q_\alpha(m)$ and the code allocation exponent $q_K(m)$ are estimated at the UE and signaled back to the base station in the feedback procedure. The method according to the first embodiment is illustrated in the flowchart of FIG. 4 and comprises the steps:

405: The BS broadcasts information about reference power allocation $\alpha_{ref}$ and/or code allocation $K_{ref}$.
410: The UE receives power allocation $\alpha_{ref}$ and/or code allocation $K_{ref}$.
415: The UE estimates SINR according to power allocation $\alpha_{ref}$ and code allocation $K_{ref}$.
416: The UE estimates SINR power allocation exponent $q_\alpha(m)$ for the reference power allocation $\alpha_{ref}$.
417: The UE estimates SINR code allocation exponent $q_K(m)$ for the reference code allocation $K_{ref}$. The steps 415-417 are repeated for each m.
420: The UE reports back to the BS power allocation exponents $q_\alpha(m)$ and code allocation exponents $q_K(m)$.
425: The BS adjusts the reported SINR estimates according to the instantaneous power and code allocation using the reported power allocation exponents and the code allocation exponents.
430: The BS selects modulation and coding scheme (MCS) based on the adjusted SINR.

In this case only the exponents relating to the first m−1 decoded streams need to be reported back. The exponents of the last decoded stream will be the same as in the corresponding SISO case, i.e $q_\alpha(m)=1$ and $q_K(m)=-1$.

Figure 5:
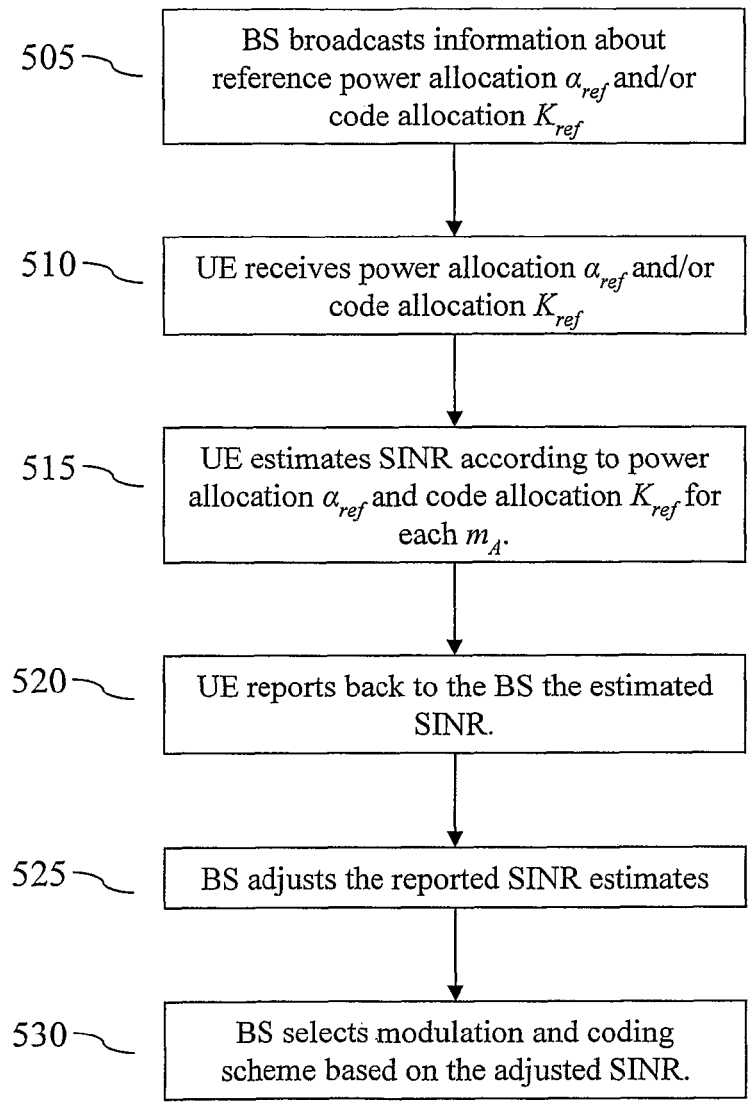
FIG. 5 is a flowchart illustrating one embodiment of the method according to the invention.

According to a second embodiment of the method of the invention the base station uses a nominal, pre-determined scaling slopes $q_\alpha(m)$ and $q_K(m)$, where these pre-determined scaling slopes are functions of m (the decoding order) and may deviate from those used in the SISO case. The method according to the second embodiment is illustrated in the flowchart of FIG. 5 and comprises the steps:

505: The BS broadcasts information about reference power allocation $\alpha_{ref}$ and/or code allocation $K_{ref}$.
510: The UE receives power allocation $\alpha_{ref}$ and code allocation $K_{ref}$.
515: The UE estimates SINR according to power allocation $\alpha_{ref}$ and code allocation $K_{ref}$ for each m.
520: The UE reports back to the BS the estimated SINR.
525: The BS adjusts the reported SINR estimates according to the instantaneous power and code allocation using the pre-determined power allocation and code allocation exponents.
530: The BS selects modulation and coding scheme (MCS) based on the adjusted SINR.

Figure 6:
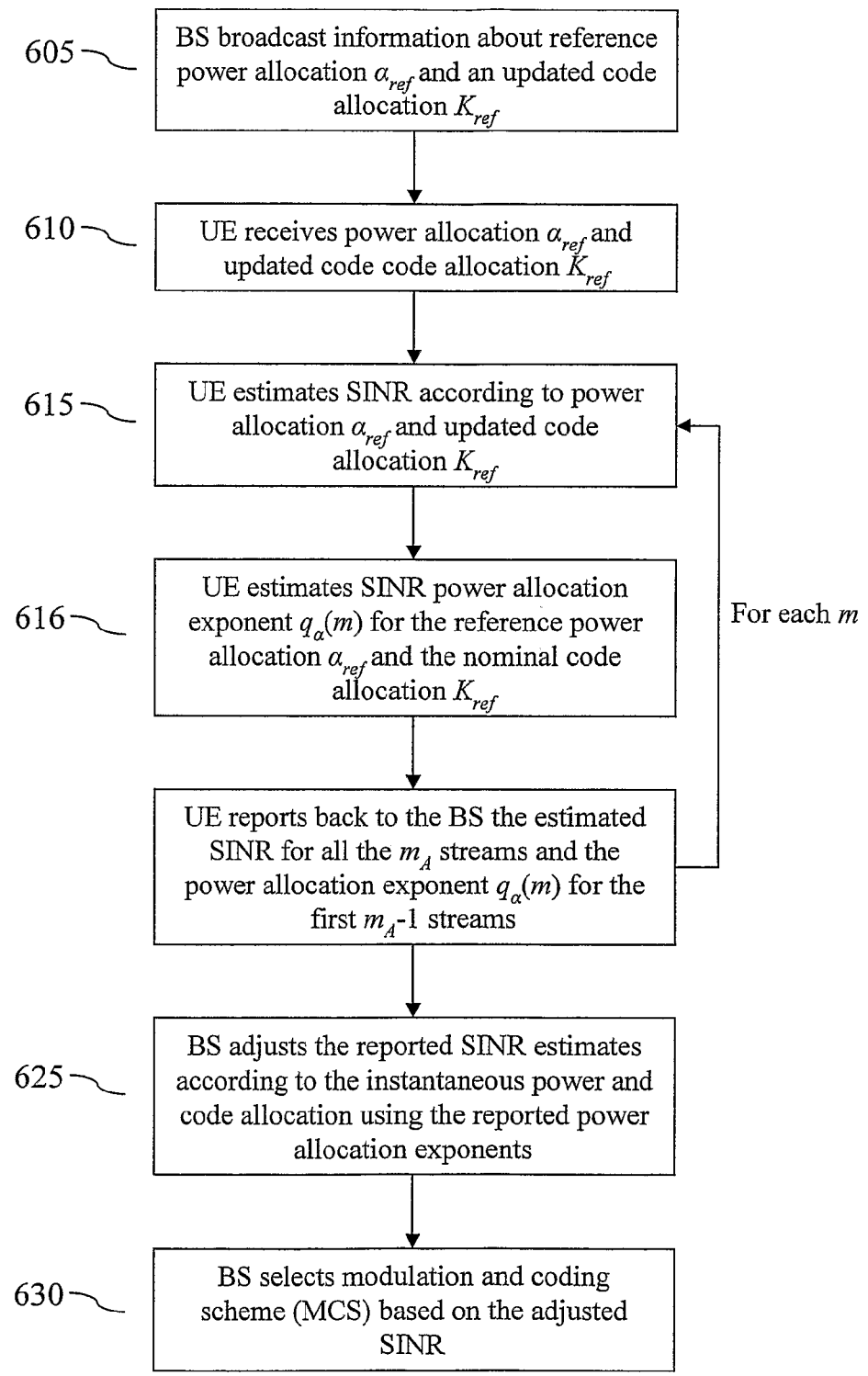
FIG. 6 is a flowchart illustrating one embodiment of the method according to the invention.

According to a third embodiment, the base station broadcasts an updated code allocation information in one of the downlink control channels. The UE estimates the output SINR based on the updated code allocation information and a nominal power allocation factor. The UE also estimates the power allocation exponent with respect to power allocation. The estimated SINR and power allocation exponent $q_\alpha(m)$ are sent to the base station, which calculates the adjusted SINR using the following steps: (1) using $q_\alpha(m)$ as the scaling slope to account for difference between instantaneous power allocation and the nominal power allocation factor, and (2) use SISO scaling slope (i.e. slope 1) to account for any deviation between the instantaneous code allocation and that broadcasted in the downlink control channel. Since the deviation in code allocation is expected to be small, using the SISO scaling slope for code allocation scaling does not contribute too much to the SINR scaling error. The method according to the third embodiment is illustrated in the flowchart of FIG. 6 and comprises the steps:

605: The BS broadcasts information about reference power allocation $\alpha_{ref}$ and an updated code allocation $K_{ref}$.

610: The UE receives power allocation $\alpha_{ref}$ and updated code allocation $K_{ref}$.

615: The UE estimates SINR according to power allocation $\alpha_{ref}$ and updated code allocation $K_{ref}$.

616: The UE estimates SINR power allocation exponent $q_\alpha(m)$ for the reference power allocation $\alpha_{ref}$ and the nominal code, allocation $K_{ref}$. The steps 615-616 are repeated for each m.

620: The UE reports back to the BS the estimated SINR for all the m streams and the power allocation exponent $q_\alpha(m)$ for the first m−1 streams.

625: The BS adjusts the reported SINR estimates according to the instantaneous power and code allocation using the reported power allocation exponents.

630: The BS selects modulation and coding scheme (MCS) based on the adjusted SINR.

Figure 7:
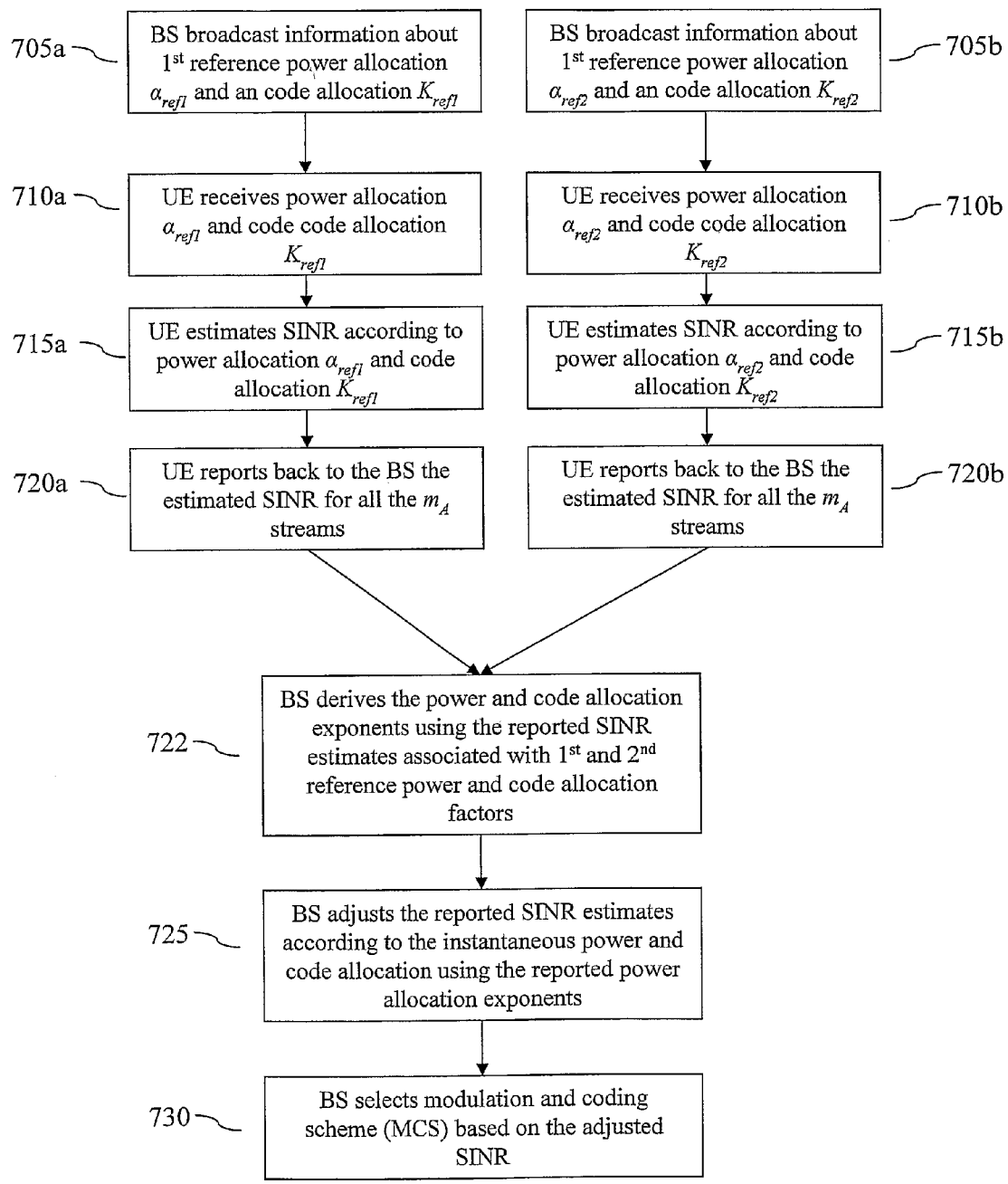
FIG. 7 is a flowchart illustrating one embodiment of the method according to the invention.

According to a $4^{th}$ embodiment of the method of the invention the UE estimates and reports SINR in a first transmission time interval (TTI) using a first reference code and power allocation, and estimates and reports SINR in a second transmission time interval (TTI) using a second reference code and power allocations. In this case the base station can derive the scaling slopes through the SINR reporting. The method according to the $4^{th}$ embodiment is illustrated in the flowchart of FIG. 7 and comprises the steps:

705.*a*: The BS broadcast information about $1^{st}$ reference power allocation $\alpha_{ref1}$ and an code allocation $K_{ref1}$.

710.*a*: The UE receives power allocation $\alpha_{ref1}$ and code allocation $K_{ref1}$.

715.*a*: The UE estimate SINR according to power allocation $\alpha_{ref1}$ and code allocation $K_{ref1}$ for each m.

720.*a*: The UE report back to the BS the estimated SINR for all the m streams.

705.*b*: The BS broadcast information about $2^{nd}$ reference power allocation $\alpha_{ref2}$ and an code allocation $K_{ref2}$.

710.*b*: The UE receives power allocation $\alpha_{ref2}$ and code allocation $K_{ref2}$.

715.*b*: The UE estimate SINR according to power allocation $\alpha_{ref2}$ and code allocation $K_{ref2}$ for each m.

720.*b*: The UE report back to the BS the estimated SINR for all the m streams.

722: The BS derives the power and code allocation exponents using the reported SINR estimates associated with $1^{st}$ reference power and code allocation factors and $2^{nd}$ reference power and code allocation factors, under the assumption that the reported SINR of the UE receiver can be modeled as a function with an dependence on the power allocation exponent and the code allocation exponent.

725: The BS adjusts the reported SINR estimates according to the instantaneous power and code allocation.

730: The BS selects modulation and coding scheme (MCS) based on the adjusted SINR.

The above described embodiments can be combined in various ways. Such variations should be obvious for the skilled in the art, given the above descriptions.

Arrangements according to the present invention in a radio base station and user equipment, respectively, suitable for effectuating the above described embodiments are schematically illustrated in FIGS. 8*a* and 8*b*. The modules and blocks according to the present invention are to be regarded as functional parts of a base station and/or an user equipment in a communication system, and not necessarily as physical objects by themselves. The modules and blocks are preferably at least partly implemented as software code means, to be adapted to effectuate the method according to the invention. However, depending on the chosen implementation, certain modules may be realized as physically distinctive objects in a receiving or sending node. The term "comprising" does primarily refer to a logical structure and the term "connected" should here be interpreted as links between functional parts and not necessarily physical connections. As is well known in the art, a specific function can be made to reside in different nodes in the communication system, depending on the current implementation. Thus, the means in the following ascribed to a sending/receiving node (base station or a user equipment), could at least partly be implemented in another node in the system, for examples in a radio network controller (RNC), but made to effectuate the signalling from the sending/receiving node.

The base station 805 comprises radio communication means 810, which provides the necessary functionalities for performing the actual reception and transmission of radio signals and is well known by the skilled person. The base station is typically a part of an access network. The radio communication means 810 are preferably adapted for communication via a plurality of antennas 815. An antenna stream, m, is associated to each antenna. The radio communication means 810 is connected to a power and code allocation module 820. According to the invention the power and code allocation module 820 comprises a broadcasting module 825 adapted to broadcast representations of power and/or code allocation to UEs. The power and code allocation module 820 further comprises a feedback reception module 830 adapted to receive feedback information relating to estimated SINRs from an UE, and a SINR adjustment module 835. The feedback reception module 825 may be adapted to receive SINR estimates, or alternatively power allocation exponents, and/or code allocation exponents or representations thereof. The SINR adjustment module 830 is adapted to adjust the reported SINR using the assumption that the output SINR of an UE receiver can be modelled as a function with one parameter having an exponential dependence on a power allocation exponent and another parameter having an exponential dependence on a code allocation exponent. A transmission parameter module 840 in connection SINR adjustment module 835 and the radio transmission means 810, is adapted to select transmission parameters such as modulation and coding scheme based on the adjusted SINR. Depending on if the UEs feed back SINR values or allocation exponents, the SINR adjustment module 835 is adapted to first derive allocation exponents from the reported SINRs or alternatively determine the instantaneous SINR (the adjusted SINR) directly.

The user equipment 855 comprises radio communication means 860, which provides the necessary functionalities for performing the actual reception and transmission of radio signals and is well known by the skilled person. The user equipment is preferably provided with a plurality of antennas 865. According to the invention the user equipment 855 is provided with a power/code allocation feedback module 870 adapted to receive broadcasted power and/or code allocations and to feedback CQI relating to power and/or code allocation. The feedback module 870 is in connection with a SINR estimation module 875, adapted to estimate SINR values using received power and/or code allocation values. According to one embodiment of the invention the user equipment 855 is adapted to feed back the SINR estimates. According to a further embodiment of the invention the user equipment 855 comprises an allocation exponent estimation module 880.

The allocation exponent estimation module 880 is adapted to from SINR estimates, provided by the SINR estimation module 875, estimate power and/or code allocation exponents, using the assumption that the SINR can be modelled as a function with an dependence on a power allocation exponent and a code allocation exponent. According to this embodiment the power/code allocation feedback module 870 is adapted to feed back allocation exponents.

The user equipment may for example be a mobile station, a laptop computer, a PDA, a camera, a video/audio player or a game pad provided with radio communication abilities. Other examples include, but is not limited to machinery provided with radio communication abilities, such as vehicles or stationary machines.

The feedback of power or code exponents/slopes can be based on the quantized values, or indices used to read a pre-stored table in the base station. Alternatively, the feedback of power or code exponents/slopes can be based on an incremental value in the sense that the user terminal only tells the difference between the latest estimated exponents/slopes and the previously estimated exponents/slopes. These feedback can be provided in every subframe (TTI), or periodically, once in a few subframes (TTIs). Also, these feedbacks can be provided by all the user terminals, or only those user terminals that are receiving downlink transmissions.

While the invention has been described in connection with what is presently considered to be the most practical and preferred embodiments, it is to be understood that the invention is not to be limited to the disclosed embodiments, on the contrary, is intended to cover various modifications and equivalent arrangements as defined by the appended claims.

The invention claimed is:

1. A method of adjusting transmission parameters in a multiple input multiple output based wireless communication system, wherein a base station is in communication with at least one user equipment utilizing a plurality of antenna streams, m, wherein the transmission parameters are adjusted based at least partly on reported channel quality indicators comprising information relating to at least one signal-to-interference-plus-noise ratio, and wherein a model of the signal-to-interference-plus-noise ratio dependencies of power and code allocation is utilized to adjust the transmission parameters in which the dependencies are modeled by a function comprising a first parameter relating only to power allocation with a power allocation exponent as an exponent value of the first parameter and a second parameter relating only to code allocation with code allocation exponent as an exponent value of the second parameter, the method comprising the steps of:

the base station broadcasting information about reference power allocation, $\alpha_{ref}$, and code allocation, $K_{ref}$;

the user equipment receiving the information about the reference power allocation, $\alpha_{ref}$, and code allocation, $K_{ref}$;

the user equipment estimating for each antenna stream, m, signal-to-interference-plus-noise ratio according to the reference power allocation, $\alpha_{ref}$, and code allocation, $K_{ref}$;

the user equipment estimating for each antenna stream, m, a signal-to-interference-plus-noise ratio power allocation exponent, $q_\alpha(m)$, for the reference power allocation, $\alpha_{ref}$;

the user equipment estimating for each antenna stream, m, a signal-to-interference-plus-noise ratio code allocation exponent, $q_k(m)$, for the reference code allocation, $K_{ref}$;

the user equipment reporting back to the base station the power allocation exponents, $q_\alpha(m)$, and the code allocation exponents, $q_k(m)$;

the base station adjusting the reported signal-to-interference-plus-noise ratio estimates according to instantaneous power and code allocation and the reported power allocation exponents and the code allocation exponents using the model of the signal-to-interference-plus-noise ratio dependence on the power allocation exponent and the code allocation exponent; and the base station selecting a modulation and coding scheme based on the adjusted signal-to-interference-plus-noise ratio.

2. The method according to claim 1, wherein the power allocation exponents, $q_\alpha(m)$, are dependent on the antenna stream.

3. The method according to claim 2, wherein at least one of the power allocation exponents, $q_\alpha(m)$, is in the range $0 < q_\alpha(m) < 1$.

4. The method according to claim 3, wherein the power allocation exponents have the relations $0 < q_\alpha(1) < q_\alpha(2) < \ldots < q_\alpha(M) = 1$, wherein $q_\alpha(M)$ represents the power allocation exponent of the last antenna stream.

5. The method according to claim 1, wherein the code allocation exponents, $q_k(m)$, are dependent on the antenna stream, m.

6. The method according to claim 5, wherein at least one of the code allocation exponents, $q_k(m)$, is in the range $-1 < q_k(m) < 0$.

7. The method according to claim 6, wherein the code allocation exponents have the relations $-1 = q_k(M) < q_K(M-1) < \ldots < q_k(1) < 0$, wherein $q_k(M)$ represents the code allocation exponent of the last antenna stream.

8. The method according to claim 1, wherein successive interference cancellation is utilized for the reception by the user equipment, and at each stage of the successive interference cancellation an output signal-to-interference-plus-noise ratio can be related, and a power allocation exponent, $q_\alpha(m)$, and a code allocation exponent $q_k(m)$, can be estimated utilizing the outputted signal-to-interference-plus-noise ratio, for each antenna stream, m.

9. The method according to claim 8, wherein the modeling function has the form:

$$SINR_{inst}(m) = \alpha^{q_\alpha(m)} b^{q_k(m)} SINR_{ref}(m),$$

wherein $SINR_{inst}(m)$ is an adjusted signal-to-interference-plus-noise ratio value to be used in the adjustment of transmission parameters, $SINR_{ref}(m)$ is an estimated signal-to-interference-plus-noise ratio value based on previously broadcasted information on reference power and/or code allocation, $\alpha$ is the first parameter relating only to power allocation, b is the second parameter relating only to code allocation, $q_\alpha(m)$ is the power allocation exponent associated with the first parameter, and $q_k(m)$ the code allocation exponent associated with the second parameter.

10. A method of adjusting transmission parameters in a multiple input multiple output based wireless communication system, wherein a base station is in communication with at least one user equipment utilizing a plurality of antenna streams, m, wherein the transmission parameters are adjusted base at least partly on reported channel quality indicators comprising information relating to at least one signal-to-interference-plus-noise ratio, and wherein a model of the signal-to-interference-plus-noise ratio dependencies of power and code allocation is utilized to adjust the transmission parameters in which the dependencies are modeled by a function comprising a first parameter relating only to power allocation with a power allocation exponent as an exponent value of the first parameter and a second parameter relating only to code allocation with a code allocation exponent as an exponent value of the second parameter, the method comprising the steps of:

the base station broadcasting information about reference power allocation, $\alpha_{ref}$, and an updated code allocation, $K_{ref}$;

the user equipment receiving the reference power allocation, $\alpha_{ref}$, and the updated code allocation, $K_{ref}$;

the user equipment estimating for each antenna stream, m, a signal-to-interference-plus-noise ratio using a nominal power factor and the updated code allocation, $K_{ref}$, wherein the nominal power factor is the reference power allocation, $\alpha_{ref}$;

the user equipment estimating for each antenna stream, a signal-to-interference-plus-noise ratio power allocation exponent, $q_\alpha(m)$, for the reference power allocation, $\alpha_{ref}$, and the updated code allocation, $K_{ref}$;

the user equipment reporting information back to the base station relating to the estimated signal-to-interference-plus-noise ratios, the information comprising the estimated signal-to-interference-plus-noise ratio for all the m antenna streams and the power allocation exponent, $q_\alpha(m)$, for the first m−1 antenna streams;

the base station adjusting the reported signal-to-interference-plus-noise ratio estimates according to the instantaneous power and code allocation using the model of the signal-to-interference-plus-noise ratio dependence on the power allocation exponent and the code allocation exponent, said adjusting comprising using the reported power allocation exponents as a scaling slop to account for a difference between the instantaneous power allocation and the reference power location and using a predetermined scaling slope to account for any deviation between the instantaneous code allocation and the broadcasted updated code allocation, wherein the predetermined scaling slop code is approximated with a code allocation exponent relating to a single input single output system; and the base station selecting a modulation and coding scheme based on the adjusted signal-to-interference-plus-noise ratios.

11. A method of adjusting transmission parameters in a multiple input multiple output base wireless communication system, wherein a base station is in communication with at least one user equipment utilizing a plurality of antenna streams, m, wherein the transmission parameters are adjusted base at least partly on reported channel quality indicators comprising information relating to at least one signal-to-interference-plus-noise ratio, and wherein a model of the signal-to-interference-plus-noise ratio dependencies of power and code allocation is utilized to adjust the transmission parameters in which the dependencies are modeled by a function comprising a first parameter relating only to power allocation with a power allocation exponent as an exponent value of the first parameter and a second parameter relating only to code allocation with a code allocation exponent as an exponent value of the second parameter, the method comprising the steps of:

the base station broadcasting information about a first reference power allocation, $\alpha_{ref1}$, and a first code allocation, $K_{ref1}$, at a first time instance;

the user equipment receiving the first reference power allocation, $\alpha_{ref1}$, and the first code allocation, $K_{ref1}$;

the user equipment estimating a signal-to-interference-plus-noise ratio for each antenna stream, m, according to the first reference power allocation, $\alpha_{ref1}$, and the first code allocation, $K_{ref1}$;

the user equipment reporting the estimated signal-to-interference-plus-noise ratios for all the antenna streams, m, back to the base station;

the base station broadcasting information about a second reference power allocation, $\alpha_{ref2}$ and a second code allocation, $K_{ref2}$, at a second time instance;

the user equipment receiving the second reference power allocation $\alpha_{ref2}$ and the second code allocation, $K_{ref2}$;

the user equipment estimating signal-to-interference-plus-noise ratios according to the second reference power allocation, $\alpha_{ref2}$, and the second code allocation, $K_{ref2}$;

the user equipment reporting back to the base station the estimated signal-to-interference-plus-noise ratio for all the antenna streams, m;

the base station deriving the power and code allocation exponents using the reported signal-to-interference-plus-noise ratio estimates associated with first reference power and code allocations and the second reference power and code allocations;

the base station adjusting the reported signal-to-interference-plus-noise ratio estimates according to instantaneous power and code allocation using the model of the signal-to-interference-plus-noise ratio dependence on the power allocation exponent and the code allocation exponent; and the base station selecting a modulation and coding scheme based on the adjusted signal-to-interference-plus-noise ratios.

* * * * *

UNITED STATES PATENT AND TRADEMARK OFFICE
CERTIFICATE OF CORRECTION

| | | |
|---|---|---|
| PATENT NO. | : 8,644,263 B2 | Page 1 of 3 |
| APPLICATION NO. | : 12/445070 | |
| DATED | : February 4, 2014 | |
| INVENTOR(S) | : Cheng et al. | |

It is certified that error appears in the above-identified patent and that said Letters Patent is hereby corrected as shown below:

IN THE DRAWINGS

1. In Fig. 1a, Sheet 1 of 7, delete " 125 ↘ 101110 ⟶ " and insert -- 101110 ⟶ --, therefor.

2. In Fig. 1a, Sheet 1 of 7, delete "Fig. 1a" and insert -- Fig. 1 --, therefor.

3. In Fig. 3, Sheet 2 of 7, for Tag "330", in Line 2, delete "parametersbased" and insert -- parameters based --, therefor.

4. In Fig. 5, Sheet 4 of 7, for Tag "515", in Line 3, delete "$m_A$." and insert -- m. --, therefor.

5. In Fig. 6, Sheet 5 of 7, delete " 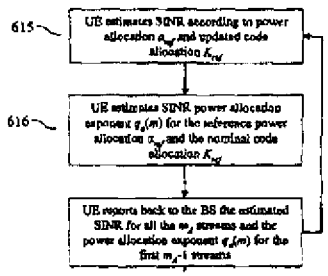 " and insert

Signed and Sealed this
Thirtieth Day of September, 2014

Michelle K. Lee
*Deputy Director of the United States Patent and Trademark Office*

CERTIFICATE OF CORRECTION (continued)
U.S. Pat. No. 8,644,263 B2

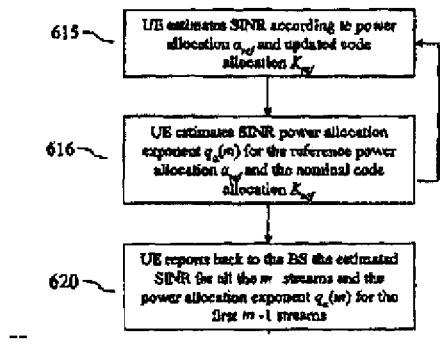

--, therefor.

6. In Fig. 7, Sheet 6 of 7, for Tag "720a", in Line 2, delete "$m_A$" and insert -- m --, therefor.

7. In Fig. 7, Sheet 6 of 7, for Tag "705b", in Line 2, delete "$1^{st}$" and insert -- $2^{nd}$ --, therefor.

8. In Fig. 7, Sheet 6 of 7, for Tag "720b", in Line 2, delete "$m_A$" and insert -- m --, therefor.

IN THE SPECIFICATION

9. In Column 2, Line 55, delete "deter wines" and insert -- determines --, therefor.

10. In Column 3, Line 42, delete "Al," and insert -- al., --, therefor.

11. In Column 4, Line 43, delete "throughput" and insert -- throughput. --, therefor.

12. In Column 7, Line 52, delete "feedbacks. and" and insert -- feedbacks and --, therefor.

13. In Column 8, Line 4, delete "case. the" and insert -- case, the --, therefor.

14. In Column 10, Line 31, delete "i.e" and insert -- i.e. --, therefor.

15. In Column 11, Line 12, delete "code, allocation" and insert -- code allocation --, therefor.

16. In Column 12, Line 34, delete "feedback reception module 825" and insert -- feedback reception module 830 --, therefor.

17. In Column 12, Line 37, delete "SINR adjustment module 830" and insert -- SINR adjustment module 835 --, therefor.

18. In Column 12, Line 47, delete "feed back" and insert -- feedback --, therefor.

19. In Column 12, Line 65, delete "feed back" and insert -- feedback --, therefor.

20. In Column 13, Line 8, delete "feed back" and insert -- feedback --, therefor.

CERTIFICATE OF CORRECTION (continued)
U.S. Pat. No. 8,644,263 B2

IN THE CLAIMS

21. In Column 13, Line 49, in Claim 1, delete "with code" and insert -- with a code --, therefor.

22. In Column 14, Line 13, in Claim 1, delete "ratio." and insert -- ratios. --, therefor.

23. In Column 14, Line 39, in Claim 8, delete "exponent" and insert -- exponent, --, therefor.

24. In Column 14, Line 45, in Claim 9, delete "$SINR_{inst}(m)=\alpha^{q\alpha(m)}b^{qk(m)}SINR_{ref}(m)$," and insert -- $SINR_{inst}(m)=\alpha^{q_\alpha(m)}b^{q_k(m)}SINR_{ref}(m),$ --, therefor.

25. In Column 14, Line 62, in Claim 10, delete "base at least" and insert -- based at least --, therefor.

26. In Column 15, Line 20, in Claim 10, delete "$K_{ref}$," and insert -- $K_{ref}$; --, therefor.

27. In Column 15, Line 33, in Claim 10, delete "slop" and insert -- slope --, therefor.

28. In Column 15, Line 35, in Claim 10, delete "location" and insert -- allocation --, therefor.

29. In Column 15, Line 39, in Claim 10, delete "slop" and insert -- slope --, therefor.

30. In Column 15, Line 46, in Claim 11, delete "base wireless" and insert -- based wireless --, therefor.

31. In Column 15, Line 50, in Claim 11, delete "base at least" and insert -- based at least --, therefor.